US012525743B2

(12) United States Patent
Liu et al.

(10) Patent No.: US 12,525,743 B2
(45) Date of Patent: Jan. 13, 2026

(54) ELECTRICAL CONNECTOR LOCKING AND STABILIZING STRUCTURE

(71) Applicant: ACES ELECTRONICS CO., LTD., Taoyuan (TW)

(72) Inventors: Yuan-Huang Liu, Taoyuan (TW); Jia-Hong Xu, Taoyuan (TW)

(73) Assignee: ACES ELECTRONICS CO., LTD., Taoyuan (TW)

( * ) Notice: Subject to any disclaimer, the term of this patent is extended or adjusted under 35 U.S.C. 154(b) by 322 days.

(21) Appl. No.: 18/311,546

(22) Filed: May 3, 2023

(65) Prior Publication Data

US 2024/0014602 A1 Jan. 11, 2024

(30) Foreign Application Priority Data

Jul. 11, 2022 (TW) ................................ 111207415

(51) Int. Cl.

*H01R 13/639* (2006.01)
*H01R 13/11* (2006.01)
*H01R 13/506* (2006.01)
*H01R 13/629* (2006.01)

(52) U.S. Cl.

CPC ........... *H01R 13/639* (2013.01); *H01R 13/11* (2013.01); *H01R 13/506* (2013.01); *H01R 13/62961* (2013.01)

(58) Field of Classification Search

CPC .... H01R 13/639; H01R 13/11; H01R 13/506; H01R 13/62961; H01R 13/6335; H01R 12/75; H01R 13/46

See application file for complete search history.

(56) References Cited

U.S. PATENT DOCUMENTS

| | | | | |
|---|---|---|---|---|
| 8,147,269 B2 * | 4/2012 | Yamaji | H01R 13/629 439/372 |
| 11,205,876 B1 * | 12/2021 | Liu | H01R 13/6582 |
| 2005/0208802 A1 * | 9/2005 | Kikuchi | H01R 13/6335 439/157 |
| 2009/0186508 A1 * | 7/2009 | Kikuchi | H01R 13/6275 439/304 |
| 2012/0094519 A1 * | 4/2012 | Ikari | H01R 13/6591 439/297 |
| 2013/0260594 A1 * | 10/2013 | Lee | H01R 12/88 439/345 |

* cited by examiner

*Primary Examiner* — Briggitte R. Hammond
(74) *Attorney, Agent, or Firm* — MUNCY, GEISSLER, OLDS & LOWE, P.C.

(57) ABSTRACT

An electrical connector locking and stabilizing structure includes a socket connector including a seat body with a docking space, conductive terminals pierced on two sides of the docking space and a metal shell assembled on the seat body with a button hole formed in each of two limit frames thereof, and a plug connector including a base having a bottom insertion portion combined with the docking space and mounted with contact terminals that are electrically connected to a transmission unit located on the top surface of the base, a shielding shell assembled with the base and having two pushing portions respectively provided with a shaft groove and a supporting portion, and a handle having two shaft portions respectively extending into the shaft grooves and the button holes with the top side limited by the limit frames and two side rods with the bottom side stopped against the supporting portions.

12 Claims, 9 Drawing Sheets

ELECTRICAL CONNECTOR LOCKING AND STABILIZING STRUCTURE

This application claims the priority benefit of Taiwan patent application number 111207415, filed on Jul. 11, 2022.

BACKGROUND OF THE INVENTION

1. Field of the Invention

The present invention relates to an electrical connector locking and stabilizing structure, which buckles two shaft portions of a handle installed in the electrical connector to the button holes in two limit frames of a metal shell, so that the socket connector and the plug connector are stably locked into one body, and provides supporting portions for use as the support point of two side rods of the handle and makes shaft portions of the handle extend obliquely against the top side of the limit frames of the metal shell, so that the handle will not shake outside the plug connector, so as to improve the simplicity and intuition of operation.

2. Description of the Related Art

General connectors are used in electronic signal and power connection components and their accessories. The main function is to provide connections between various electronic devices or equipment, and to ensure accurate signal transmission. With the different products, power and environment of use, connectors have developed various types, and can be widely used in consumer electronic products such as computers, notebook computers, smart phones, or household appliances, telecommunication and communication equipment and other fields. And because the design of electronic products nowadays tends to be light, thin, short and small, the connectors inside various electronic products need to be greatly reduced accordingly. In contrast, it is bound to be more difficult to connect and fix thin connectors with general wires or flexible circuit boards.

Furthermore, as the volume of electronic products becomes thinner and thinner, the structure of the components mounted on the circuit board inside the electronic product needs to be more precise and miniaturized, and the overall structural strength also needs to be strengthened accordingly. General connectors (such as: board-to-board connectors or wire-to-board connectors, etc.) usually use a male connector and a female connector for mating and docking, and the signal or power can be transmitted to the control circuit through the circuit board to execute the corresponding operation function.

However, when the male connector and the female connector are docked, in order to reduce the overall structural height, most of them are assembled by fitting. First insert the main body of the male connector into the fitting space of the female connector, and make the convex buckle of the main body buckle in the buckle groove of the base, then the multiple conductive terminals of the main body can be resisted and contacted with the corresponding contact terminals on the base to form an electrical connection, so as to realize the electrical connection between two parallel and opposite circuit boards, or between flexible circuit boards, cables and circuit boards.

However, since the main body and the base are integrally molded by colloid made of resin, the way that the main body and the base are fitted together using the convex buckle and the buckle groove will cause mutual wear and tear due to multiple plugging and docking, and cause the overall fitting force to decrease. Even when assembling or disassembling, it is easy to cause damage to the colloid or structural damage due to excessive extrusion. Moreover, when docking, the plurality of conductive terminals and the plurality of contact terminals are butt joints through the frictional contact fit between a single side, and the positioning effect of each other is not ideal. Once impacted or touched by external force, it is easy to cause loosening or separation between the male connector and the female connector, resulting in unstable signal transmission between the male connector and the female connector.

Therefore, how to solve the lack and inconvenience of the above-mentioned common usage is the direction that those skilled in the art eagerly want to study and improve.

SUMMARY OF THE INVENTION

Therefore, in view of the above-mentioned problems and deficiencies, the inventor collected relevant information, and after various evaluations and considerations, the inventor designed this electrical connector locking and stabilizing structure.

It is therefore the main objective of the present invention to provide an electrical connector locking and stabilizing structure, which comprises a socket connector and a plug connector. The socket connector comprises a seat body with a docking space inside, a plurality of conductive terminals pierced on two opposite sides of the docking space, and a metal shell assembled on the outside of the seat body. The metal shell comprises two limit frames respectively provided on two sides thereof, and a button hole formed in each limit frame. The plug connector comprises a base, a shielding shell and handle. The base comprises an insertion portion located on the bottom side thereof and combined with the docking space, a connecting portion located on the top surface thereof, and a plurality of contact terminals pierced the insertion portion and disposed in contact with the conductive terminals to form electrical connections. The contact terminals each have one side thereof electrically connected to a transmission unit positioned on the connecting portion of the base. The shielding shell is assembled with the base. The shielding shell comprises two pushing portions respectively located on two opposite sides thereof, and two shaft grooves respectively located on the two pushing portions. Each shaft groove is provided with a supporting portion. The handle comprises two shaft portions respectively extending into the shaft grooves and the button holes with the top side thereof limited by the limit frames, and two side rods with the bottom side thereof stopped against the supporting portions. The handle has opposing upper and lower contact points thereof respectively abut against the limit frames and the supporting portions to form a locked and stable structure. In this way, the two shaft portions of the handle are fastened to the button holes in the two limit frames of the metal shell, thereby stably locking the socket connector and the plug connector into one body. The supporting portions can also be used as the support point of the side rods of the handle and make the shaft portions of the handle obliquely stretched against the top side of the limit frames of the metal shell, so that the handle will not shake outside the plug connector, so as to improve the simplicity and intuition of operation.

It is another objective of the present invention to provide an electrical connector locking and stabilizing structure, wherein each supporting portion can be selectively an interference area formed by one respective shaft groove in the radial lock and provided for a bottom side of a supporting block in the shape of a bulge between one respective side rod and respective shaft portion of the handle to form an interference state, a bump punched outward from one respective pushing portion, or a reflexion piece folded outward from a bottom side of one respective pushing portion.

It is still another objective of the present invention to provide an electrical connector locking and stabilizing structure, wherein the seat body of the socket connector has the bottom surface thereof concavely provided with a plurality of terminal slots communicating with the docking space for positioning the conductive terminals.

It is still another objective of the present invention to provide an electrical connector locking and stabilizing structure, wherein the metal shell is provided with a perforation for exposing the docking space.

It is still another objective of the present invention to provide an electrical connector locking and stabilizing structure, wherein the shaft groove of each pushing portion has a guide surface provided on the top side thereof and formed with a convex arc block, and the two side rods of the handle are oppositely provided with a respective guide block that resists the respective guide surface to form an outwardly stretched state, and the guide block is arc-shaped.

It is still another objective of the present invention to provide an electrical connector locking and stabilizing structure, wherein an abutting surface is provided on an outer side of each pushing portion and on the other side of the respective shaft groove relative to the respective supporting portion for propelling the respective side rod of the handle relatively outward when in the unlocked state, and the structure of the abutting surface can be an integral convex arc block with respective guide surface or a reflexion piece folded outwards from a vertical wall edge of the respective pushing portion.

DETAILED DESCRIPTION OF THE PREFERRED EMBODIMENT

Figure 1:
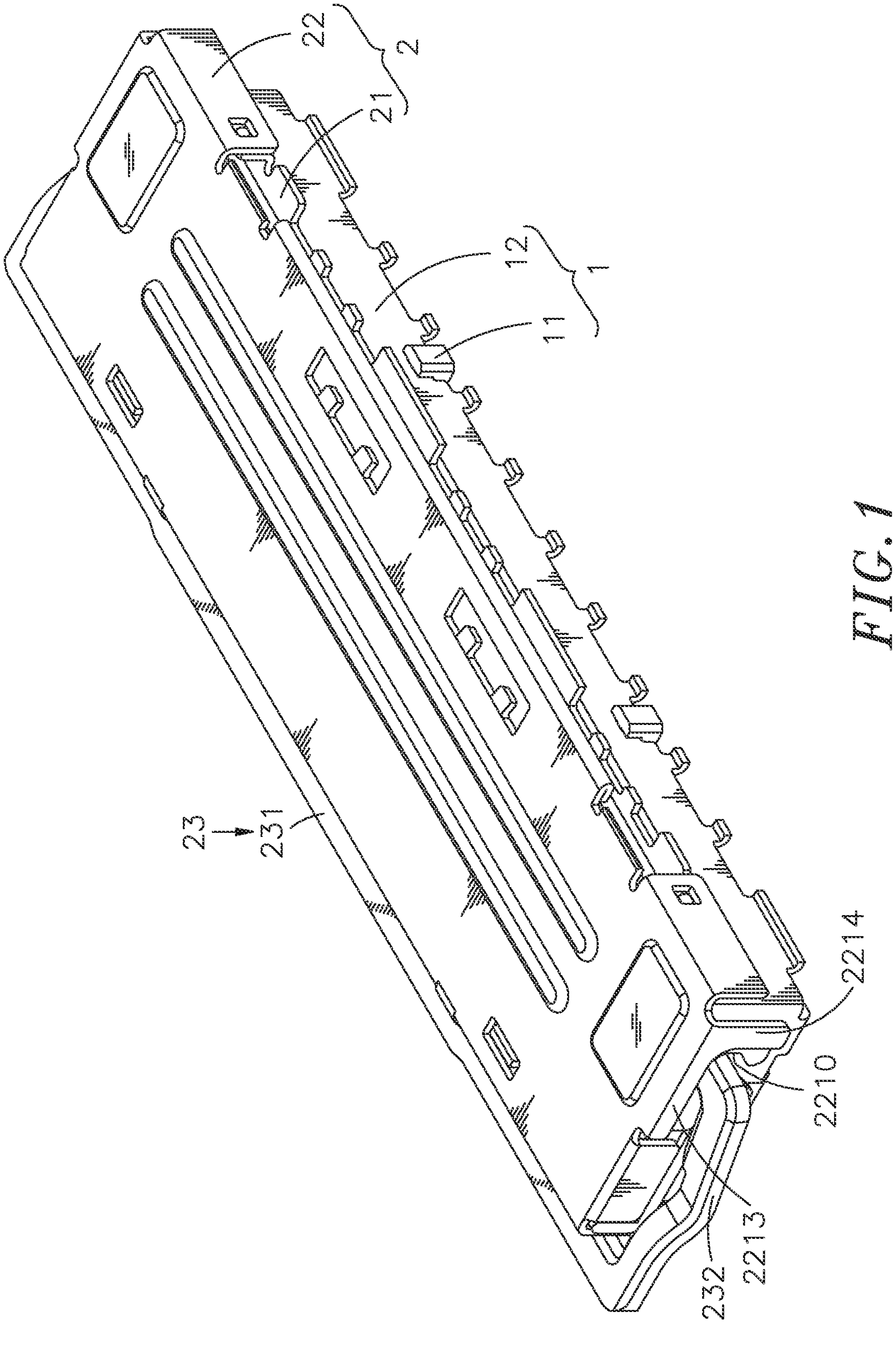
FIG. 1 is a three-dimensional appearance view of the first shielding shell used in the electrical connector of the present invention.
Figure 2:
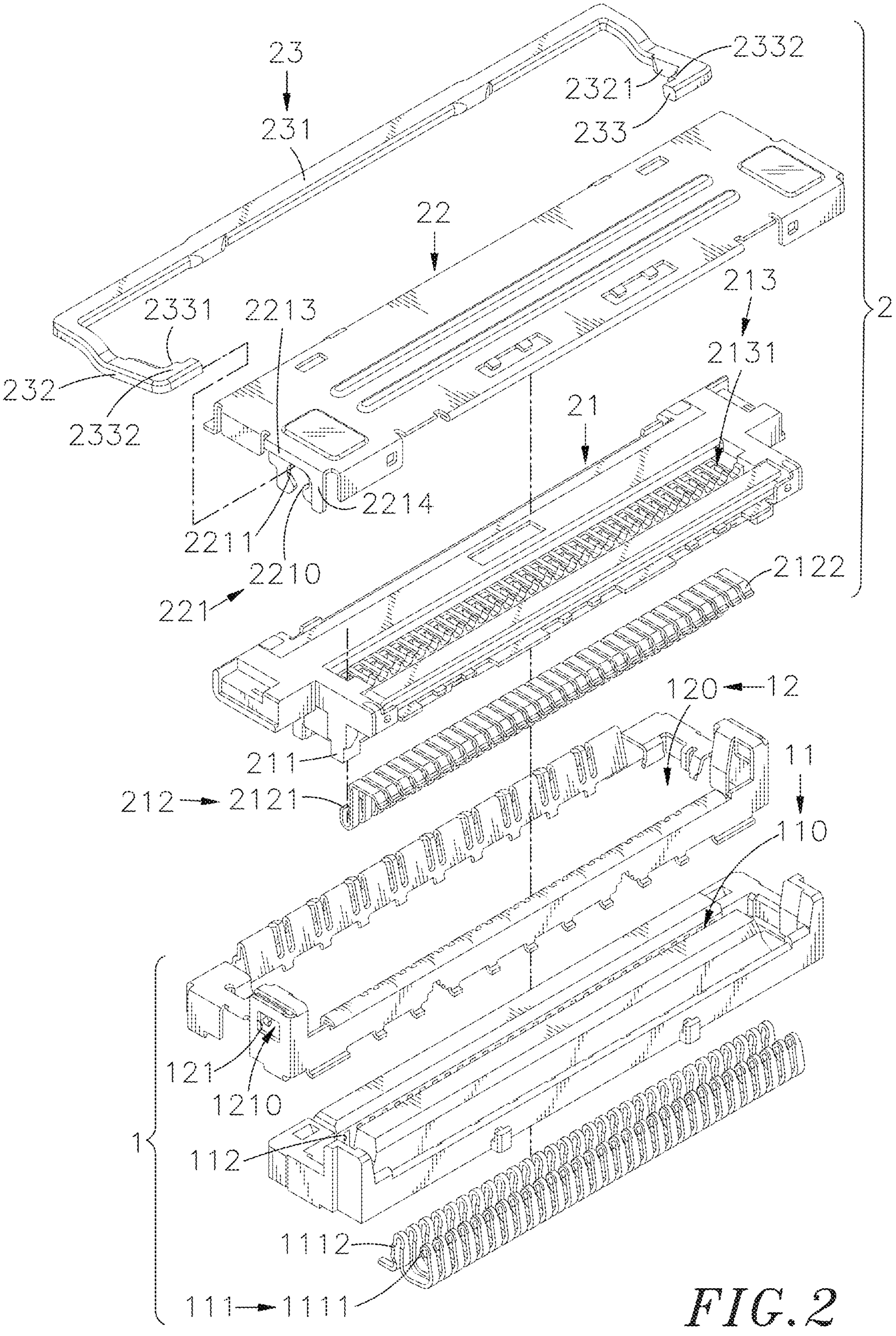
FIG. 2 is a three-dimensional exploded view of the first shielding shell used in the electrical connector of the present invention.
Figure 3:
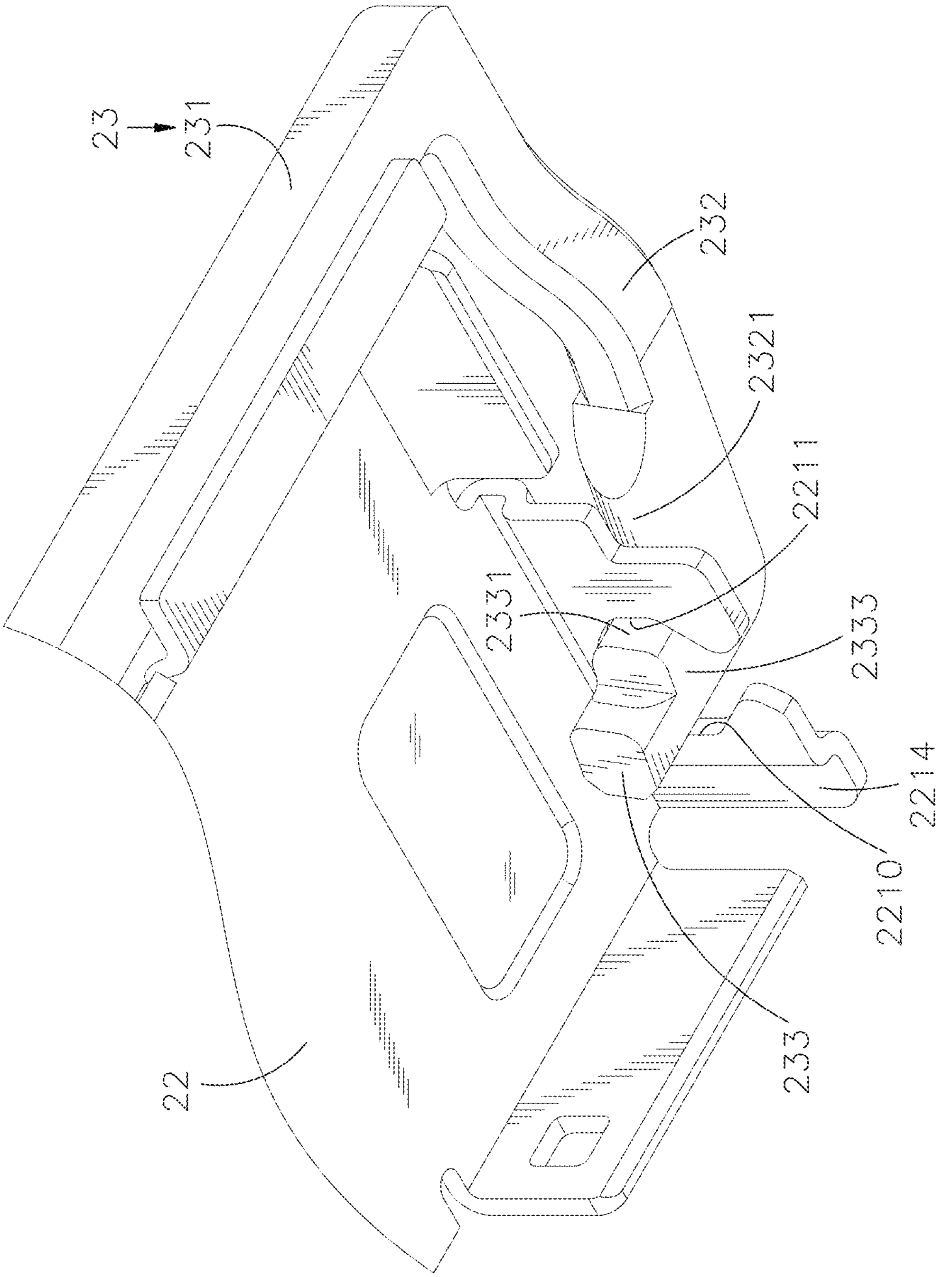
FIG. 3 is a partial structural diagram of the electrical connector of the present invention using the first shielding shell in the locked state.
Figure 4:
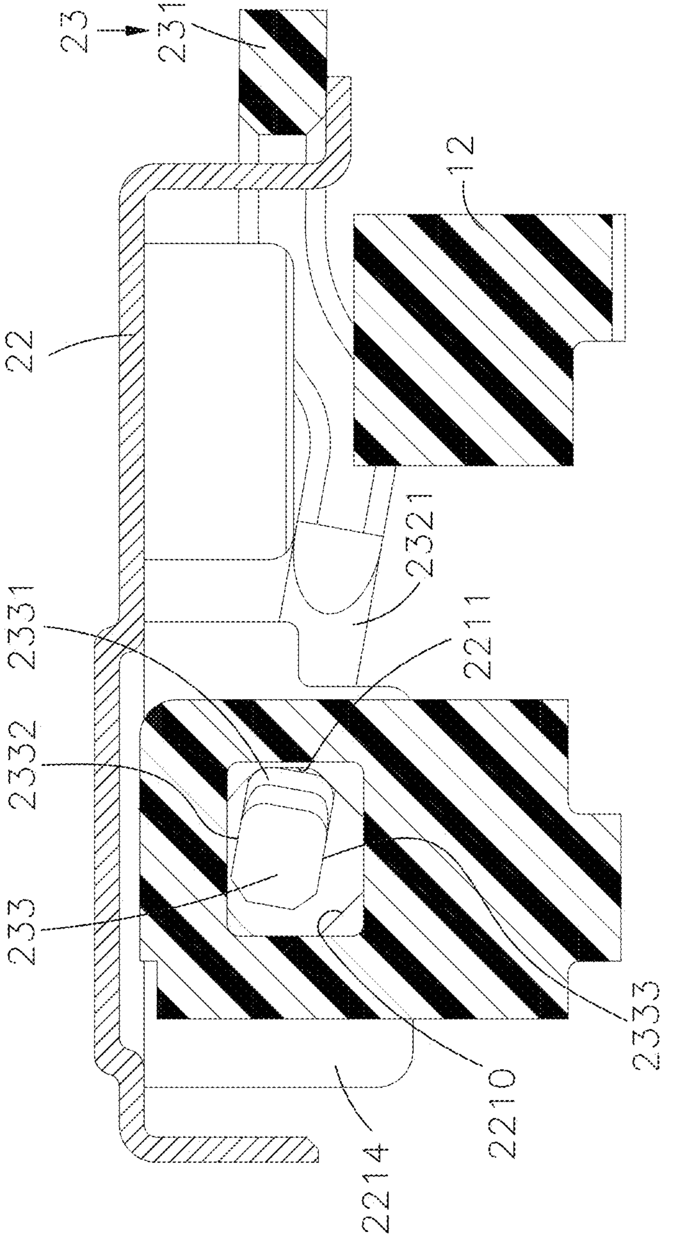
FIG. 4 is a side sectional view of the electrical connector of the present invention using the first shielding shell in the locked state.
Figure 5:
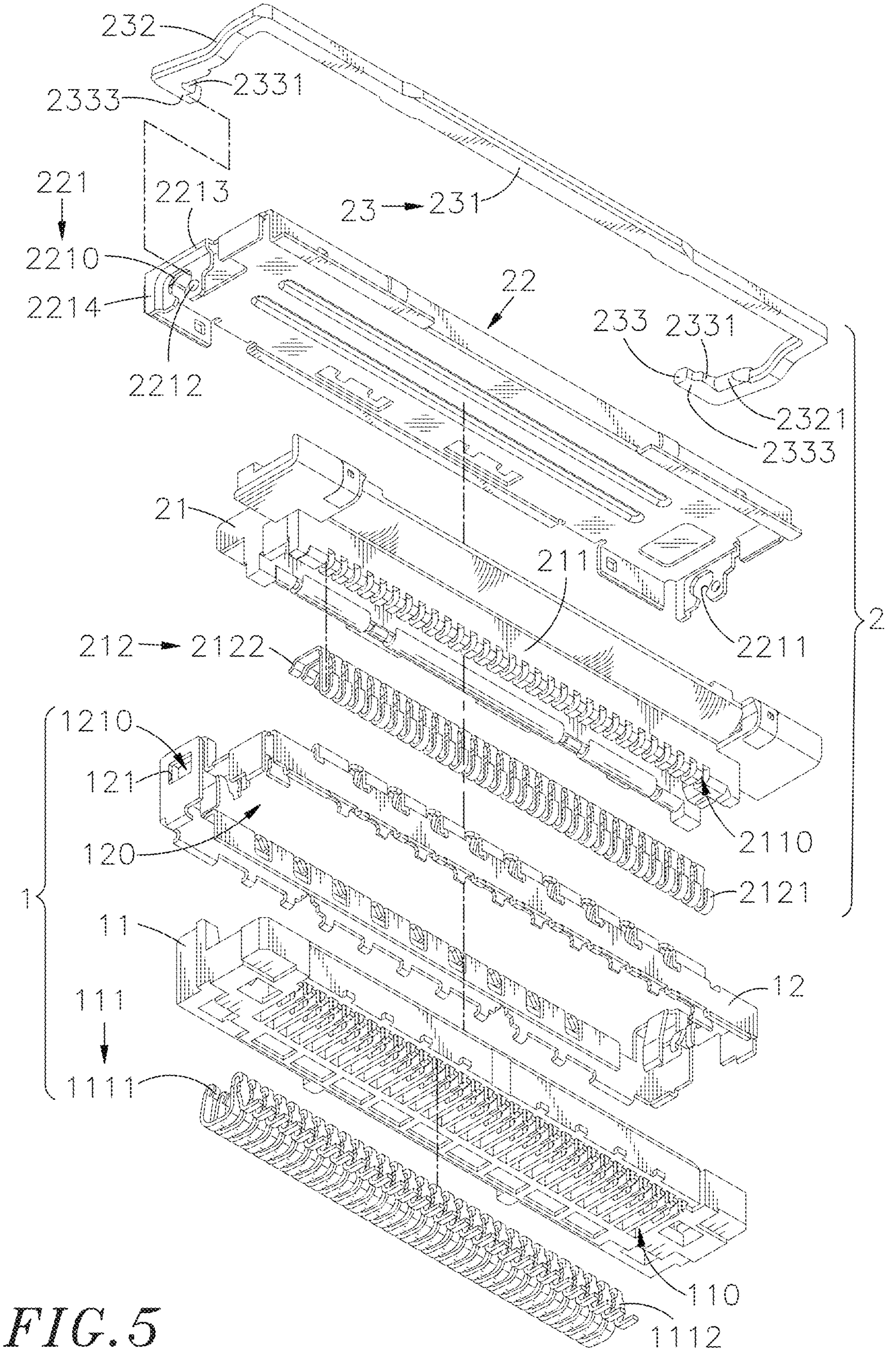
FIG. 5 is a three-dimensional exploded view of the second shielding shell used in the electrical connector of the present invention.
Figure 6:
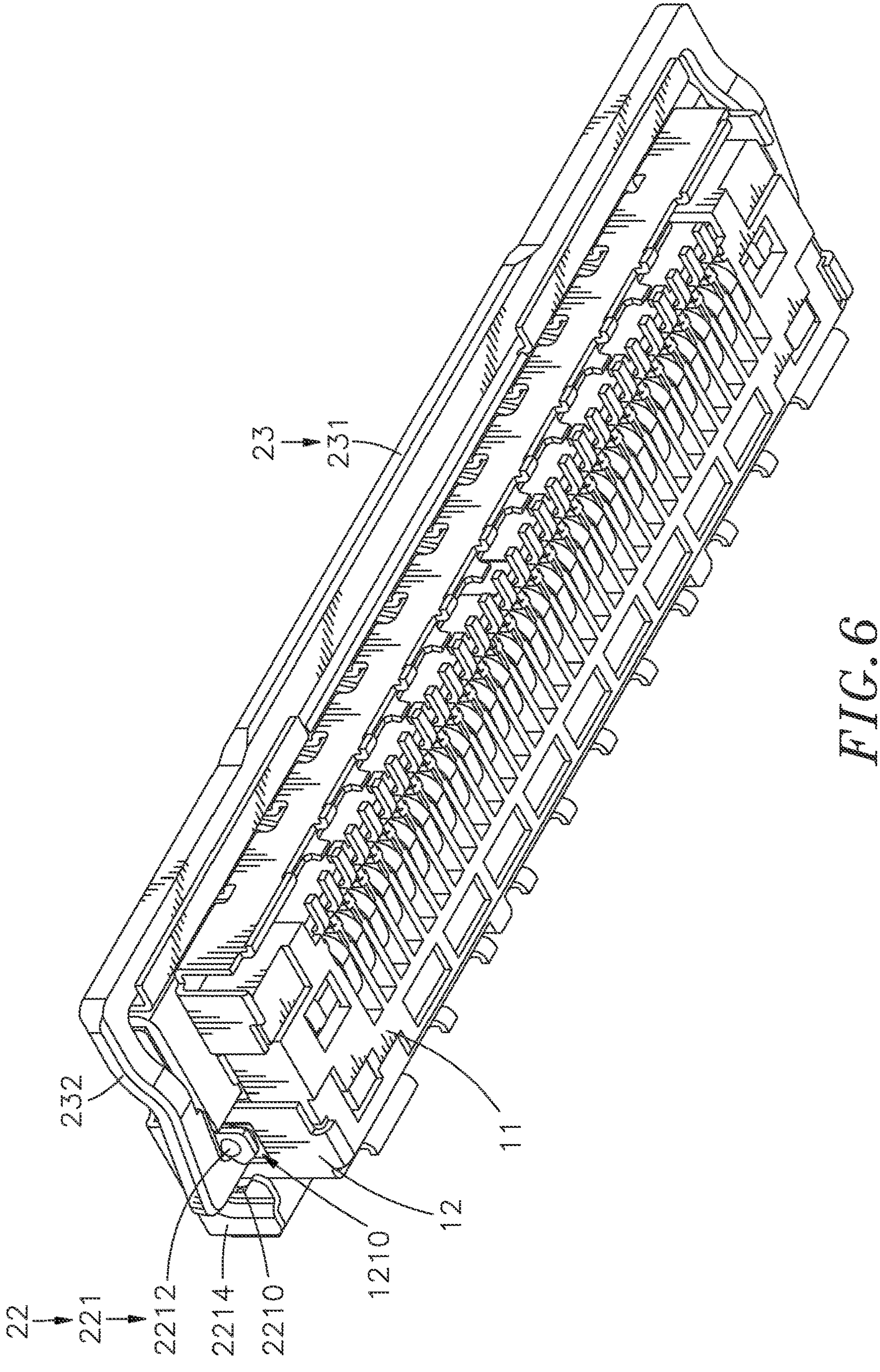
FIG. 6 is a three-dimensional appearance view of the second shielding shell used in the electrical connector of the present invention.
Figure 7:
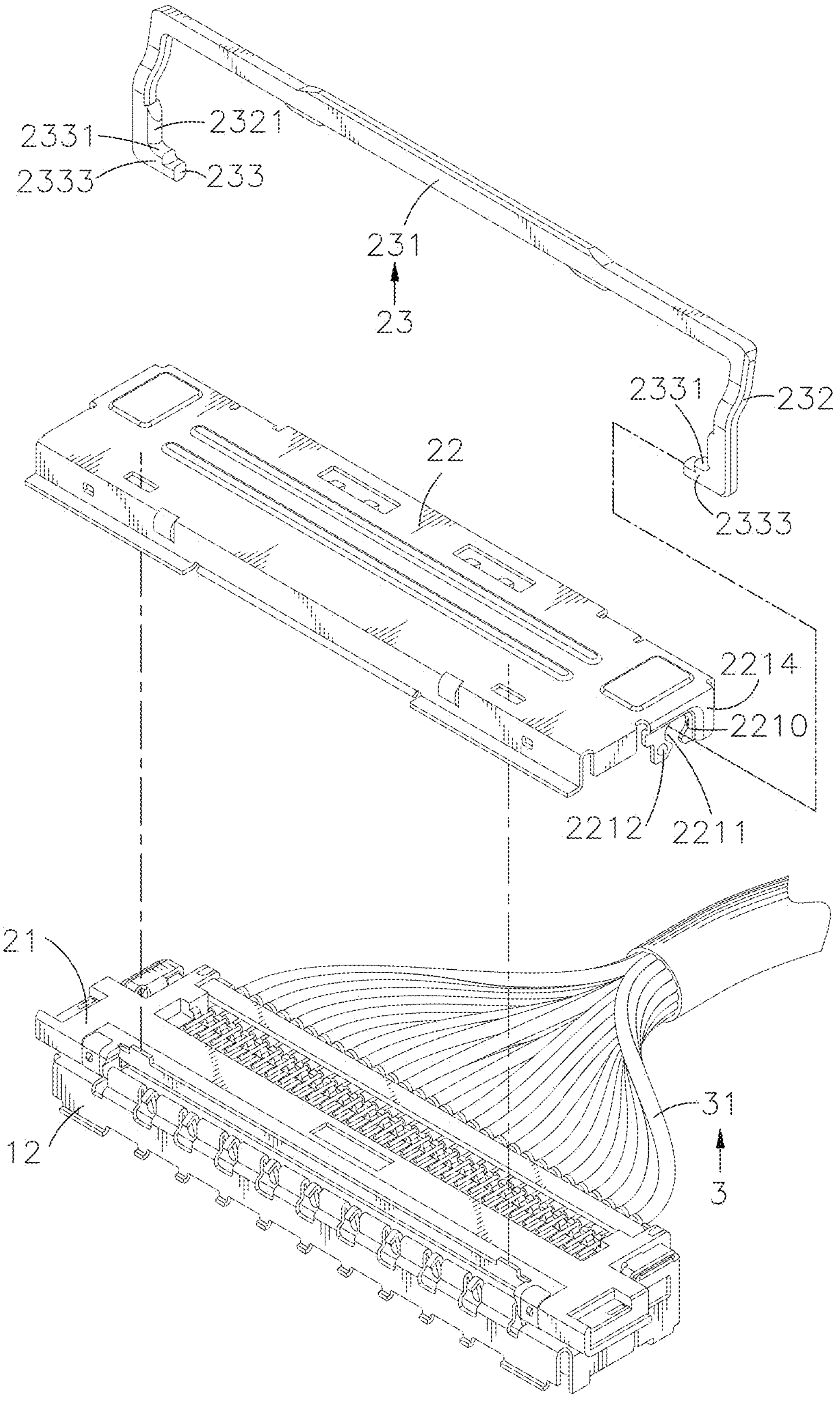
FIG. 7 is a partial perspective exploded view of the electrical connector and the transmission unit of the present invention after assembly.
Figure 8:
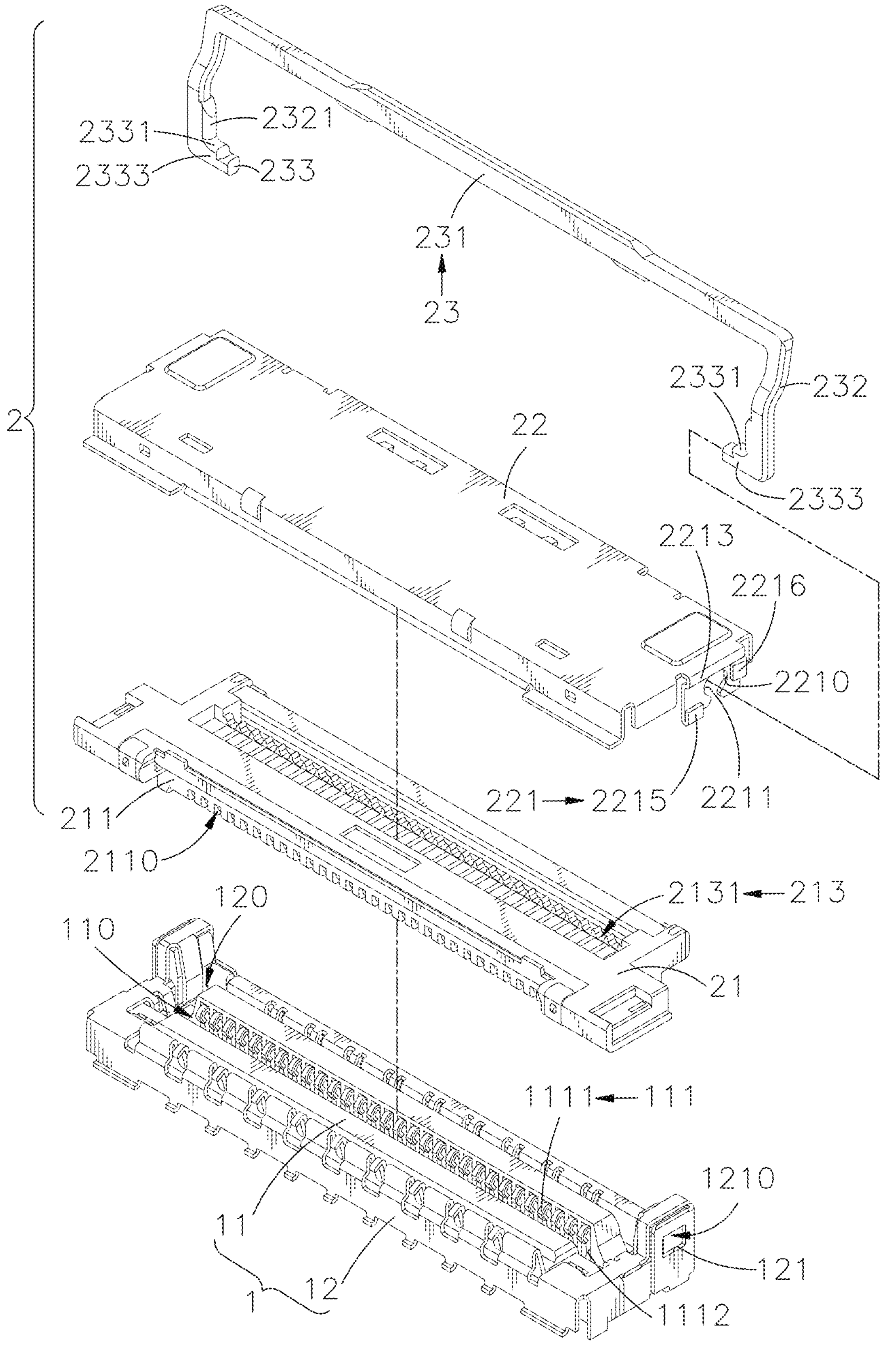
FIG. 8 is a three-dimensional exploded view of the third shielding shell used in the electrical connector of the present invention.
Figure 9:
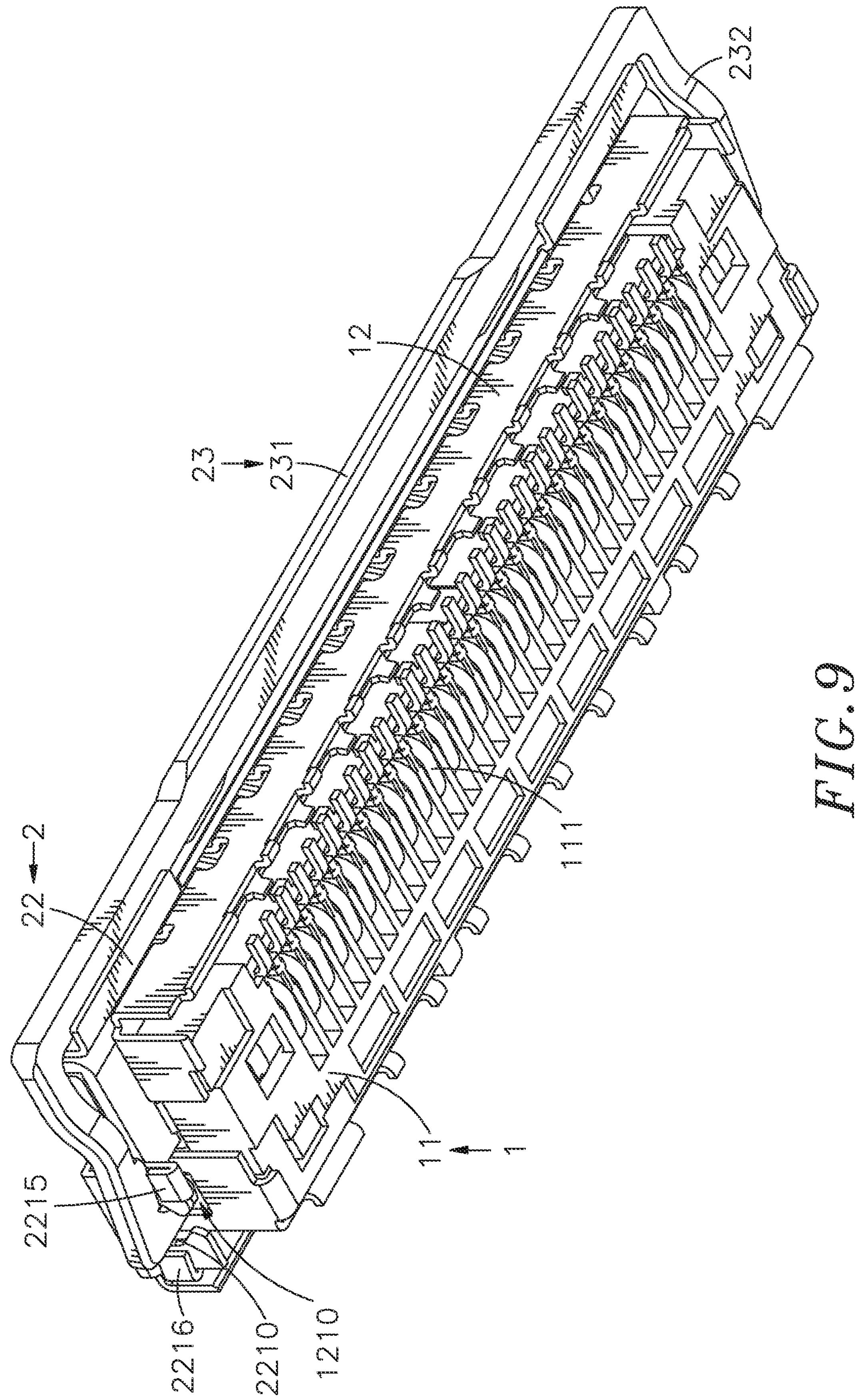
FIG. 9 is a three-dimensional appearance view of the third shielding shell used in the electrical connector of the present invention.

Please refer to FIGS. 1-9, where FIG. 1 is a three-dimensional appearance view of the first shielding shell used in the electrical connector of the present invention, FIG. 2 is a three-dimensional exploded view of the first shielding shell used in the electrical connector of the present invention. FIG. 3 is a partial structural diagram of the electrical connector of the present invention using the first shielding shell in the locked state, FIG. 4 is a side sectional view of the electrical connector of the present invention using the first shielding shell in the locked state, FIG. 5 is a three-dimensional exploded view of the second shielding shell used in the electrical connector of the present invention, FIG. 6 is a three-dimensional appearance view of the second shielding shell used in the electrical connector of the present invention. FIG. 7 is a partial perspective exploded view of the electrical connector and the transmission unit of the present invention after assembly. FIG. 8 is a three-dimensional exploded view of the third shielding shell used in the electrical connector of the present invention and FIG. 9 is a three-dimensional appearance view of the third shielding shell used in the electrical connector of the present invention. It can be clearly seen from the drawings that the electrical connector of the present invention comprises a socket connector 1, a plug connector 2 and a transmission unit 3. The detailed structure and connection relationship of the aforementioned components are as follows:

The socket connector 1 comprises a seat body 11 with a docking space 110 inside, a plurality of conductive terminals 111 pierced on both sides of the docking space 110, and a metal shell 12 assembled on the outside of the seat body 11. The metal shell 12 has a limit frame 121 respectively provided on each of the two sides thereof, and a button hole 1210 is formed in each of the two limit frames 121.

The plug connector 2 comprises a base 21. The bottom side of the base 21 has an insertion portion 211 combined with the docking space 110, and the insertion portion 211 is pierced with a plurality of contact terminals 212 that are in contact with the conductive terminals 111 to form electrical connections. One side of the contact terminals 212 is electrically connected to the transmission unit 3 positioned on a connecting portion 213 on the top surface of the base 21. The base 21 is assembled with a shielding shell 22, and the two sides of the shielding shell 22 are respectively provided with a pushing portion 221, and the two pushing portions 221 are respectively provided with a shaft groove 2210 for the shaft portions 233 on both sides of a handle 23 to extend into and locate. The shaft groove 2210 is provided with a supporting portion against the bottom side of the two side rods 232 of the handle 23 at the radially locked position. The shaft portions 233 extend into the button holes 1210 and the top side of the shaft portions 233 is limited by the limit frames 121. Through the top side of the limit frames 121 and the supporting portions to respectively abut against the upper and lower contact points 2332, 2333 of the handle 23, a locked and stable structure is formed.

The bottom surface of the seat body 11 of the above-mentioned socket connector 1 is concavely provided with a plurality of terminal slots 112 communicating with the docking space 110 for positioning the conductive terminals 111.

The metal shell 12 mentioned above is provided with a perforation 120 for exposing the docking space 110.

The plurality of contact terminals 212 of the above-mentioned plug connector 2 are preferably integrally molded with the base 21 by means of insert molding using plastic, but in practical applications, the plurality of contact terminals 212 can also be assembled into the base 21 respectively through buckling, interference, pressing or other assembly methods. However, there are many ways to combine multiple contact terminals 212 on the base 21. Therefore, all structures that can achieve the aforementioned effects should be covered by the present invention, and such simple modifications and equivalent structural changes should be included in the patent scope of the present invention in the same way.

The bottom surface of the insertion portion 211 of the above-mentioned base 21 is recessed with a plurality of accommodating grooves 2110 for the positioning of the contact portions 2121 of the contact terminals 212.

The connecting portion 213 of the above-mentioned base 21 is provided with a plurality of wire slots 2131 arranged at intervals. The transmission unit 3 further comprises a plurality of wires 31 positioned in the wire slots 2131 respectively, and wire cores (not shown) that are welded on the welding portions 2122 of the contact terminals 212 are passed through the respective wires 31.

The bottom side of the shaft groove 2210 of each pushing portion 221 mentioned above has an opening (not marked) for the respective shaft portion 233 of the handle 23 to slide into and assemble.

Please refer to FIGS. 2 to 4, the above supporting portion refers to an interference area 2211 formed by the shaft groove 2210 in the radial lock, and the interference area 2211 is provided for the bottom side of a supporting block 2331 in the shape of a bulge between the side rod 232 and the shaft portion 233 of the handle 23 to form an interference state. In this embodiment, no bumps or folded pieces are set on the left side of the shaft groove 2210 of the pushing portion 221. Simply relying on the supporting block 2331 of the handle 23 and the interference area 2211 on the left side of the shaft groove 2210 (as shown in FIG. 2) to form an interference state, the shaft portion 233 of the handle 23 is upturned and abutted against the top side of the limit frame 121. Please refer to FIG. 5, or it is a bump punched outward from the pushing portion 221 (such as the first stopper portion 2212 disclosed in FIG. 5). Please refer to FIG. 8, or it is a reflexion piece that is folded outward from the bottom side of the pushing portion 221 (such as the second stopper portion 2215 disclosed in FIG. 8).

The top side of the shaft groove 2210 of the above-mentioned pushing portion 221 is a guide surface 2213 formed with a convex arc block. The two side rods 232 of the handle 23 are oppositely provided with a respective guide block 2321 that resists the respective guide surface 2213 to form an outwardly stretched state and is also arc-shaped.

Please refer to FIGS. 2 and 5, on the outer side of each of the two pushing portions 221 and on the other side of the shaft groove 2210 relative to the interference area 2211 of the shaft groove 2210 or the first stopper portion 2212, a first abutting surface 2214 is provided for propelling the respective side rod 232 of the handle 23 relatively outward when in the unlocked state. The structure of the first abutting surface 2214 is an integral convex arc block with the guide surface 2213. As shown in FIG. 8, or on the other side of the shaft groove 2210 relative to the second stopper portion 2215, a second abutting surface 2216 reflexed outward by the vertical wall edge of the pushing portion 221 is formed. The distance between the two side rods 232 is less than the distance between the two abutting surfaces (first abutting surfaces 2214 or second abutting surfaces 2216).

The above-mentioned handle 23 comprises a long base rod 231, and the two ends of the base rod 231 turn toward one side and extend with the side rod 232. The two side rods 232 then turn towards the opposite inner sides to form the shaft portions 233.

The shape of the above-mentioned side rods 232 is to extend parallelly from the base rod 231 first, then make an arc-shaped turning downwards, and then extend obliquely upwards to the shaft portions 233; or the shape of the side rods 232 is a straight strip structure (not shown). Although the side rods 232 with a straight strip structure are not drawn for text description, they are only the simple modification and implementation structure of the side rods 232 of the handle 23 of the present invention, and should be included in the protection scope of the present invention.

The above-mentioned conductive terminals 111 each further comprise a butt end 1111 which is in contact with the respective contact terminal 212 to form an electrical connection, and the other side of the butt end 1111 is extended and bent to form a connection end 1112 fixed in the respective terminal slot 112 of the seat body 11.

The above-mentioned contact terminals 212 each further comprises a contact portion 2121 in contact with the respective conductive terminal 111 to form an electrical connection, and the other side of the contact portion 2121 is bent and extended with a welding portion 2122 extending into the top surface of the base 21.

The above-mentioned transmission unit 3 is preferably a plurality of wires 31, but in actual application, the transmission unit 3 can also be formed by a flexible printed circuit (FPC), a flexible flat cable (FFC) or a circuit board. The transmission unit 3 is preferably electrically connected to the welding portions 2122 of the plurality of contact terminals 212 by welding, but in practical applications, the electrical connection can also be formed by means of crimping or piercing connection. However, there are many ways for the transmission unit 3 to be combined with the plurality of contact terminals 212, so all structures that can achieve the aforementioned effects should be covered by the present invention, and such simple modifications and equivalent structural changes should be included in the present invention in the same way within the scope of the invention patent.

Please refer to FIGS. 8 and 9, each of which is a three-dimensional exploded view and a three-dimensional appearance view of the third shielding shell used in the electrical connector of the present invention. It differs from the structure disclosed in FIGS. 5 to 7 only in the pushing portions 221 on both sides of the shielding shell 22. There are two differences in the structure. One is that the second stopper portion 2215 of the pushing portion 221 is formed by a reflexion piece that is folded outward from the bottom side of the shielding shell 22. It is different from the first stopper portion 2212 of the pushing portion 221 disclosed in FIG. 3, which is formed by a bump punched outward by the shielding shell 22. The second is that on the other side of the second stopper portion 2215, there is a second abutting surface 2216 formed by a reflexion piece that is folded outward from the vertical wall edge of the pushing portion 221. The structure of the first abutting surface 2214 disclosed in FIG. 3 is different from that of the guide surface 2213 as an integral convex arc block. Except for the aforementioned two structural differences, the components disclosed in FIGS. 8 and 9 are the same as those disclosed in FIGS. 1 to 7.

During the actual assembly operation of the electrical connector of the present invention, the socket connector 1 can firstly connect the connection ends 1112 of the plurality of conductive terminals 111 to the plurality of contacts on the surface of the preset circuit board (not shown) by surface mount technology (SMT), through hole or other electrical connection methods. When socket connector 1 and plug connector 2 are connected to each other, the handle 23 set on plug connector 2 can be turned upward first. Since the distance between the side rods 232 on both sides of the handle 23 is less than the distance between the first abutting surfaces 2214 (or second abutting surfaces 2216) of the two pushing portions 221, therefore, the side rods 232 on the two sides of the handle 23 will be pushed apart by the first abutting surfaces 2214 (or second abutting surfaces 2216) of the two pushing portions 221, and relatively outwardly stretched. Then assemble the base 21 of the plug connector 2 downward to the seat body 11 of the socket connector 1, so that the insertion portion 211 of the base 21 can be inserted into the docking space 110 of the seat body 11. At this time, the contact portions 2121 of the plurality of contact terminals 212 are in electrical contact with the butt ends 1111 of the plurality of conductive terminals 111 to form an electrical conduction state.

Based on the above, after the plug connector 2 is assembled downward on the socket connector 1, the base rod 231 of the handle 23 can be rotated in a direction away from the first abutting surfaces 2214 (or second abutting surfaces 2216), so that the two shaft portions 233 of the handle 23 are rotated in the shaft grooves 2210 on both sides of the pushing portions 221, and the base rod 231 of the handle 23 are rotated to the front of the plug connector 2. At the same time, the supporting blocks 2331 of the handle 23 contact the interference areas 2211 on the left side of the shaft grooves 2210 and form an interference state. Or the side rods 232 of the handle 23 are limited to the top of the first stopper portions 2212 (or second stopper portions 2215) of the pushing portions 221 and between the lower edge of the guide surfaces 2213, and the two side rods 232 of the handle 23 are held against the top side of the first stopper portions 2212 (or second stopper portions 2215) of the shielding shell 22. In this way, the side rods 232 of the handle 23 are elastically reset, so that the shaft portions 233 of the handle 23 are snapped into the button holes 1210 on both sides of the metal shell 12, and the top side of the shaft portions 233 is limited by the limit frames 121, so that the socket connector 1 and plug connector 2 are stably locked together. And the supporting portions (interference areas 2211, first stopper portions 2212 or second stopper portions 2215) can be used as the support points of the two side rods 232 of the handle 23 and make the shaft portions 233 of the handle 23 obliquely extend against the top side of the limit frames 121 of the metal shell 12, so that the handle 23 will not shake outside the plug connector 2.

When it is desired to separate the plug connector 2 from the socket connector 1, the base rod 231 of the handle 23 can be rotated in the direction of the first abutting surfaces 2214 (or second abutting surfaces 2216), so that the handle 23 can be pulled back to the upper position. During the rotation process of the handle 23, the two side rods 232 slide along the guide surfaces 2213 of the two pushing portions 221 relative to the inner guide blocks 2321, so that the two side rods 232 can rotate smoothly. At the same time, the side rods 232 on both sides of the handle 23 are again pushed by the first abutting surfaces 2214 (or second abutting surfaces 2216) of the two pushing portions 221, and relatively outwardly stretched. In this way, the second shaft portions 233 of the handle 23 are separated from the button holes 1210 of the limit frames 121 on both sides of the metal shell 12, so that the socket connector 1 and the plug connector 2 are in an unlocked state. Then pull the plug connector 2 upwards, so that the contact portions 2121 of the plurality of contact terminals 212 are separated from the butt ends 1111 of the plurality of conductive terminals 111, and then the use of the present invention is completed.

The main technical feature of the present invention is that the two pushing portions 221 are provided with shaft grooves 2210 for the shaft portions 233 on both sides of the handle 23 to be inserted into and positioned, and one side of the shaft grooves 2210 is provided with two supporting portions (interference areas 2211, first stopper portions 2212 or second stopper portions 2215) that resist the side rods 232 of the handle 23 at the locking position. So that the second shaft portions 233 of the handle 23 are upturned. And the shaft portions 233 extend into the button holes 1210 and the top side of the shaft portions 233 is limited by the limit frames 121. The top side of the limit frames 121 and the supporting portions are held against the upper and lower contact points 2332, 2333 of the handle 23 respectively to form a locked and stable structure. In this way, the two shaft portions 233 of the aforementioned handle 23 are fastened to the button holes 1210 in the two limit frames 121 of the metal shell 12, thereby stably locking the socket connector 1 and the plug connector 2 into one body. And the supporting portions can be used as the supporting points of the side rods 232 of the handle 23 and make the shaft portions 233 of the handle 23 extend obliquely against the top side of the limit frames 121 of the metal shell 12, so that the handle 23 will not shake outside the plug connector 2 to achieve the purpose of improving the simplicity and intuition of operation. The present invention is applied in the field of wire-end electrical connectors, and has excellent practicability, so a patent application is filed to seek patent protection.

What the invention claimed is:

1. An electrical connector locking and stabilizing structure, comprising:

- a socket connector comprising a seat body with a docking space inside, a plurality of conductive terminals pierced on two opposite sides of said docking space, and a metal shell assembled on an outside of said seat body, said metal shell comprising two limit frames respectively provided on two sides thereof and a button hole formed in each said limit frame; and
- a plug connector comprising a base, a shielding shell and a handle, said base comprising an insertion portion located on a bottom side thereof and combined with said docking space, a connecting portion located on a top surface thereof and a plurality of contact terminals pierced said insertion portion and disposed in contact with said conductive terminals to form electrical connections, said contact terminals each having one side thereof electrically connected to a transmission unit positioned on said connecting portion of said base, said shielding shell being assembled with said base, said shielding shell comprising two pushing portions respectively located on two opposite sides thereof and two shaft grooves respectively located on said two pushing portions, each said shaft groove being provided with a supporting portion, said handle comprising two shaft portions respectively extending into said shaft grooves and said button holes with a top side thereof limited by said limit frames and two side rods with a bottom side thereof stopped against said supporting portions, said handle having opposing upper and lower contact points thereof respectively abutting against a top side of said limit frames and said supporting portions to form a locked and stable structure;

wherein said shaft groove of each said pushing portion has a guide surface provided on a top side thereof and formed with a convex arc block, and said two side rods of said handle are oppositely provided with a respective guide block that resists the respective said guide surface to form an outwardly stretched state, said guide block being arc-shaped.

2. The electrical connector locking and stabilizing structure as claimed in claim 1, wherein each said supporting portion is selectively an interference area formed by one respective said shaft groove and provided for a bottom side of a supporting block in the shape of a bulge between one respective said side rod and respective said shaft portion of said handle to form an interference state, a bump punched outward from one respective said pushing portion, or a reflexion piece folded outward from a bottom side of one respective said pushing portion.

3. The electrical connector locking and stabilizing structure as claimed in claim 1, wherein said seat body of said socket connector has a bottom surface thereof concavely provided with a plurality of terminal slots communicating with said docking space for positioning said conductive terminals.

4. The electrical connector locking and stabilizing structure as claimed in claim 1, wherein said metal shell is provided with a perforation for exposing said docking space.

5. The electrical connector locking and stabilizing structure as claimed in claim 1, wherein said insertion portion of said base has a bottom surface thereof recessed with a plurality of accommodating grooves for the positioning of a plurality of contact portions of said contact terminals.

6. The electrical connector locking and stabilizing structure as claimed in claim 1, wherein said connecting portion of said base is provided with a plurality of wire slots arranged at intervals; said transmission unit further comprises a plurality of wires positioned in said wire slots respectively, and a plurality of wire cores respectively welded on a plurality of welding portions of said contact terminals and passed through the respective said wires.

7. The electrical connector locking and stabilizing structure as claimed in claim 1, wherein said shaft groove of each said pushing portion has a bottom side thereof provided with an opening for respective said shaft portion of said handle to slide into and assemble.

8. The electrical connector locking and stabilizing structure as claimed in claim 1, wherein an abutting surface is provided on an outer side of each of said two pushing portions and on a side of one respective said shaft groove relative to one respective said supporting portion for propelling one respective said side rod of said handle relatively outward when in the unlocked state, a structure of said abutting surface being selectively an integral convex arc block with respective said guide surface or a reflexion piece folded outwards from a vertical wall edge of one respective said pushing portion.

9. The electrical connector locking and stabilizing structure as claimed in claim 1, wherein said handle further comprises a long base rod, said base rod having two ends thereof turning toward one side and extending with respective said side rods, and said two side rods then turning towards opposite inner sides to form respective said shaft portions.

10. The electrical connector locking and stabilizing structure as claimed in claim 9, wherein a shape of said two side rods is to extend parallelly from said base rod first, then make an arc-shaped turning downwards, and then extend obliquely upwards to respective said shaft portions, or selectively, the shape of said side rods is a straight strip structure.

11. The electrical connector locking and stabilizing structure as claimed in claim 1, wherein said conductive terminals each further comprise a butt end located on one end thereof and disposed in contact with respective said contact terminal to form an electrical connection, and a connection end extended and bent from an opposite end thereof and fixed in a plurality of terminal slots of said seat body.

12. The electrical connector locking and stabilizing structure as claimed in claim 1, wherein said contact terminals each further comprises a contact portion located on one end thereof and disposed in contact with respective said conductive terminal to form an electrical connection, and a welding portion located on an opposite end thereof and extending into a top surface of said base.

* * * * *